3,746,688
CONTINUOUS DRYING AND CRYSTALLIZATION
PROCESS FOR POLYESTERS
Eugene E. Berkau, Cincinnati, Ohio, assignor to
Monsanto Company, St. Louis, Mo.
No Drawing. Filed Aug. 4, 1971, Ser. No. 169,125
Int. Cl. C08g *17/003, 22/10*
U.S. Cl. 260—75 T          5 Claims

ABSTRACT OF THE DISCLOSURE

Wet amorphous polyethylene terephthalate flake is dried by exposing the flake to a temperature just below the crystallization temperature under high vacuum until the moisture content of the flake is less than about 0.05 percent; thereafter raising the temperature to above the crystallization temperature with minimal mechanical agitation.

BACKGROUND OF THE INVENTION

This invention relates to drying flakes of amorphous polymer, and more particularly to drying flakes, chips or granules of amorphous polymeric linear polyesters.

As included herein, polymeric linear polyesters are those having fiber-forming properties and which are composed of a substantial portion (at least 85% by weight) of an ester of a dihydric alcohol and terephthalic acid. These polyesters are those obtained by the polycondensation of glycols and terephthalic acid or an ester-forming derivative thereof. Polyethylene terephthalate is the preferred polyester.

It is often the practice that polyethylene terephthalate, having been polymerized, is extruded into rods or ribbons which are quenched by water. The rods are then cut into flakes or granules in which form they may be subjected to further polymerization in the solid state; or they may be melted and subsequently forced through a spinnerette. In either case, it is essential that the flakes or granules be thoroughly dried. A number of methods of drying of the solid amorphorus chips or granules have been taught in the prior art. Perhaps the most common was the heating of the flake at temperatures below the melting point while tumbling the flake on a rolling drum. Tumbling was necessary to avoid the sticking of the flakes together which becomes a serious problem, particularly in a continuous process, clogging machinery and causing stoppages. It has been taught to avoid sticking by treating the amorphous granules with a swelling agent and exposing them to temperatures up to about 110° C. to cause a partial crystallization before drying at yet higher temperatures.

It is an object of this invention to provide a method of drying wet polyester flake under conditions which although not requiring elimination of movement, will minimize the necessity for movement.

It is another object of this invention to provide a method for drying polyester flake without the necessity for a pre-treatment with a swelling agent.

It is yet another object of this invention to provide a simple inexpensive method of continuously drying polyester flake.

Briefly, the objects of this invention are accomplished by treating the flake by exposure to temperatures just below the crystallization temperature and at a pressure equal to or less than about 10 millimeters mercury (absolute), until the water concentration as the flake exits from the drying area is low enough to prevent massive sticking; i.e. or until the moisture content is below about 0.05 percent; and then exposing the flake to a temperature above the crystallization temperature of the flake at the same pressure with minor agitation.

Although the drying and crystallization stages of the instant invention may take place in separate vessels, as applied to a batch process, it is preferred to dry and crystallize in a continuous process. Just as in prior art processes, both drying and crystallization may be in the presence of air or an inert gas. When drying is accomplished before crystallization, there will be little or no sticking or hydrolysis of the flake. Sticking is a result of crystallization before all surface moisture has been removed. Because crystallization is exothermic, the temperature of the particle increases; and if all or nearly all of the surface moisture has not been removed, plasticization of the extremities of the particles will occur.

EXAMPLES

Polyethylene terephthalate flake is exposed to a temperature of 82° for 1.5 hours at a pressure of 10 millimeters mercury absolute in a screw conveyor, precise dwell-time being adjusted until water concentration at the end of the drying stage is sufficient to prevent massive sticking of the flake. The flake then progresses into the crystallization section where under separate control, the temperature of this portion of the conveyor is raised to 95° C. Pressure remains constant throughout the extruder. Dwell time in the crystallization section of the conveyor is not critical. Crystallization occurs rapidly. A small amount of agitation is used to discourage the minor sticking of the flake.

Ten samples of the flake were exposed to the following conditions in the above described screw conveyor:

TABLE

| | Drying conditions at— | | | | | | | |
|---|---|---|---|---|---|---|---|---|
| | Heat temp. (° C.) | | Pressure (mm. Hg) | Dwell time (hours) | Thruput (grams/ min.) | Agitator speed (r.p.m.) | Length of experiment (hours) | Comment |
| Ex. | Entrance | Exit | | | | | | |
| 1 | 80 | 150 | 3.0 | 2.0 | 8.0 | 7 | 2.5 | Flow rate fell, flake stuck on agitator. |
| 2 | 80 | 150 | 3.0 | 2.0 | 8.0 | 7 | 2.5 | Do. |
| 3 | 80 | 80 | 3.0 | 2.0 | 8.0 | 7 | 2.5 | Flake temp. inside=80. |
| 4 | 80 | 80 | 0.6 | 2.0 | 8.0 | 7 | 4.2 | Do. |
| 5 | 85 | 85 | 0.6 | 2.0 | 8.0 | 7 | 4.2 | Do. |
| 6 | 95 | 95 | 0.8 | 2.0 | 8.0 | 7 | 2.0 | Fow rate stopped, flake stuck throughout. |
| 7 | 85 | 95 | 0.7 | 2.0 | 8.0 | 7 | 2.0 | Flow rate stopped, flake stuck outlet. |
| 8 | 85 | 95 | 0.6 | 2.0 | 8.0 | 7 | 2.0 | Flow rate stopped, flake stuck center. |
| 9 | 85 | 90 | 0.5 | 4.0 | 4.0 | 4 | 5.0 | Flow rate stopped. |
| 10 | 85 | 90 | 0.5 | 4.0 | 4.0 | 4 | 3.5 | Flow rate stopped, flake stuck. |
| 11 | 85 | 90 | 0.5 | | | 20 | .5 | Flow rate increased to 43 grams/min. |
| 12 | 85 | 90 | 0.5 | | | 50 | | Flow rate immediately increased to 50 grams/min. |

Examples 1 and 2 were run without agitation. In Examples 3-5, no crystallization was attempted. Sticking was minimal, and drying was accomplished to 0.023, 0.039 and 0.012 percent respectively. As shown in Example 6, temperature as high 95° could not be tolerated in the drying phase. In Examples 7 and 8, conveyor activity stopped due to insufficient removal of moisture in the drying phase. In Examples 9 and 10, dwell time was increased, and sufficient water was removed for the continuous crystallization process without excess sticking. The flow rate stopped only because of insufficient agitation. In Examples 11 and 12, with increased agitation, flow rate was satisfactory.

I claim:

1. A continuous method of drying and crystallizing polymeric flakes composed of at least 85% by weight of an ester of dihydric alcohol and terephthalic acid comprising:
    (a) treating the flake at just below the crystallization temperature of the granule and at a pressure equal to or less than 10 mm. Hg absolute until the water concentration is low enough so as to prevent massive sticking of the flake; then
    (b) exposing the flake to a temperature above the crystallization temperature of the flake at the same pressure with minor agitation.
2. The method of claim 1 wherein treatment of the flake at below the crystallization temperature continues until the moisure content of the flake is below 0.05%.
3. The method of claim 1 wherein the treatment below the crystallization temperature is conducted at a temperature of about 80° C.
4. The method of claim 1 wherein the treatment above crystallization temperature is conducted at about 90° C.
5. The method of claim 1 wherein total treatment time is 1-4 hours.

References Cited

UNITED STATES PATENTS

| 3,657,191 | 4/1972 | Titzmann et al. | 260—75 E P |
| 3,014,011 | 12/1961 | Zoetbrood | 260—75 T |

FOREIGN PATENTS

| 635,070 | 1/1962 | Canada | 260—75 T |
| 558,778 | 6/1958 | Canada | 260—75 T |
| 836,742 | 6/1960 | Great Britain | 260—75 T |
| 850,590 | 10/1960 | Great Britain | 260—75 T |

WILLIAM F. O'DEA, Primary Examiner

W. C. ANDERSON, Assistant Examiner

U.S. Cl. X.R.

34—15